(12) United States Patent
Maeda et al.

(10) Patent No.: US 6,226,589 B1
(45) Date of Patent: May 1, 2001

(54) SYSTEM FOR PROVIDING GUIDING INFORMATION FOR USE IN DETECTING AND ACCESSING A MOBILE OBJECT

(75) Inventors: Yoshiharu Maeda; Kuniharu Takayama; Hirohisa Naito; Minoru Sekiguchi, all of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/473,048

(22) Filed: Dec. 28, 1999

(30) Foreign Application Priority Data

Mar. 12, 1999 (JP) .................................................. 11-065748

(51) Int. Cl.⁷ .................................................. G06F 165/00
(52) U.S. Cl. .................... 701/207; 701/214; 342/357.01; 342/357.09; 340/991
(58) Field of Search ..................................... 701/207, 214; 342/357.01, 357.07, 357.09; 455/39, 500, 507; 340/902, 988, 991, 992, 993, 425.5, 438

(56) References Cited

U.S. PATENT DOCUMENTS

| | | | |
|---|---|---|---|
| 5,208,756 | * | 5/1993 | Song ..................................... 455/456 |
| 5,418,537 | * | 5/1995 | Bird ................................. 342/357.09 |
| 6,097,959 | * | 8/2000 | Yost et al. ............................. 455/456 |
| 6,138,003 | * | 10/2000 | Kingdon et al. ....................... 455/410 |
| 6,151,498 | * | 11/2000 | Roel-Ng et al. ....................... 455/433 |

FOREIGN PATENT DOCUMENTS

| | | |
|---|---|---|
| 8-511408 | 11/1996 | (JP) . |
| 9-068427 | 3/1997 | (JP) . |
| 10-122895 | 5/1998 | (JP) . |
| 10-268021 | 10/1998 | (JP) . |

* cited by examiner

Primary Examiner—William A. Cuchlinski, Jr.
Assistant Examiner—Gertrude Arthur
(74) Attorney, Agent, or Firm—Staas & Halsey LLP

(57) ABSTRACT

The mobile object data storage unit of the management center manages and stores the positional information and the attribute information about a number of unspecified mobile objects such as persons, creatures, objects, etc. moving outdoors, etc. Upon receipt of the detection condition of the position and the attribute of another mobile object from the terminal unit, the retrieval unit searches the mobile object data storage unit, and displays a list of corresponding mobile objects on the requesting terminal unit. The guiding information computation unit computes the guiding information to a detected mobile object selected by the requesting mobile object terminal unit depending on a predetermined privacy setting level, and transmits the guiding information to the requesting mobile object terminal unit.

19 Claims, 14 Drawing Sheets

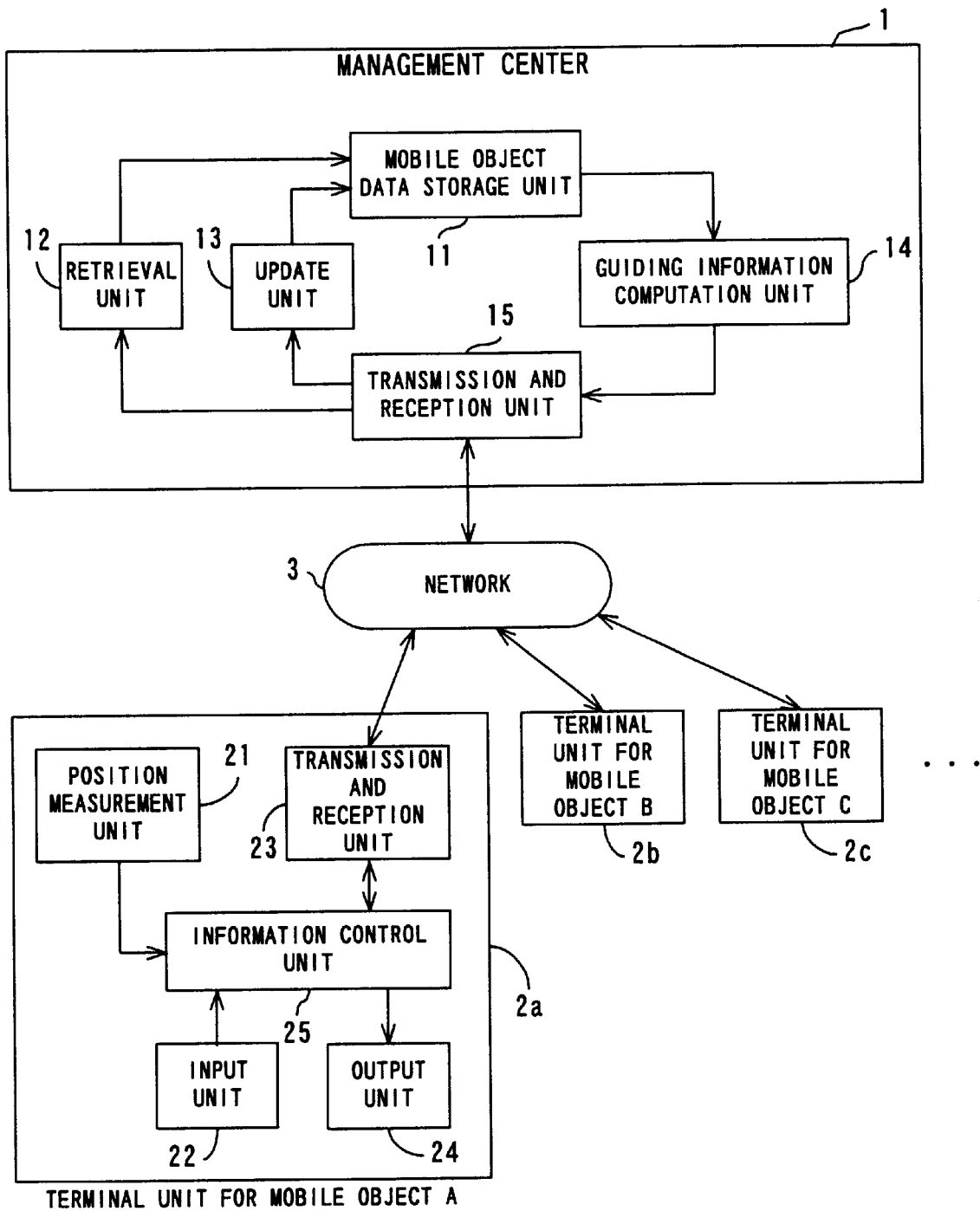
F I G. 1

MOBILE OBJECT DATA STORAGE UNIT — 11

MOBILE OBJECT DATA

| | |
|---|---|
| MOBILE OBJECT ID | A12B3 |
| ACCESS INFORMATION | 1234567890 |
| PASSWORD | ABCD |
| PRIVACY SETTING | REQUESTING PASSWORD |
| CLASSIFICATION | COMMON |
| NAME | HANTARO BOSO |
| GENDER | MALE |
| BIRTHDAY | JANUARY 1, 19.. |
| OCCUPATION | OFFICE CLERK |
| ADDRESS | ..., CHIBA CITY, CHIBA PREFECTURE |
| MOBILE TELEPHONE | 0123(456)7890 |
| HOME TELEPHONE | 098(765)4321 |
| ELECTRONIC MAIL | abc@xyy |
| HOBBY | BASEBALL, MOUNTAIN-CLIMBING, ... |
| POSITION COORDINATE | (AT LONGITUDE 133 EAST AND LATITUDE 35 NORTH) |
| MEASUREMENT TIME | 13:30 |
| PAST POSITIONAL DATA | (△△, ○○), ... |
| FREE COLUMN | COLLECTING BASEBALL MATCH |

F I G.   6

YOU HAVE BEEN DETECTED.
- ○ DETECTION CONDITION: BASEBALL, CHIBA CITY, MATCH
- ○ ATTRIBUTE OF DETECTION REQUESTER:
    GENDER: MALE, POSITION: MINATO WARD, TOKYO, ···
- ○ IS PRIVACY SETTING TO BE CHANGED? [YES/NO]
    (CURRENT SETTING: UNPUBLISHED)

FIG. 10

DETECTION RESULT
(CONDITION: BASEBALL, CHIBA CITY, MATCH)

| NUMBER | ATTRIBUTE | PRIVACY SETTING |
|---|---|---|
| 1 |  | UNPUBLISHED |
| 2 | MALE, 25 YEARS OLD | LIMITED TO GUIDE LEVEL 5 |
| 3 |  | CONSULTATION REQUIRED |
| 4 | MALE, 28 YEARS OLD | PUBLISHED |

F I G.  1 1

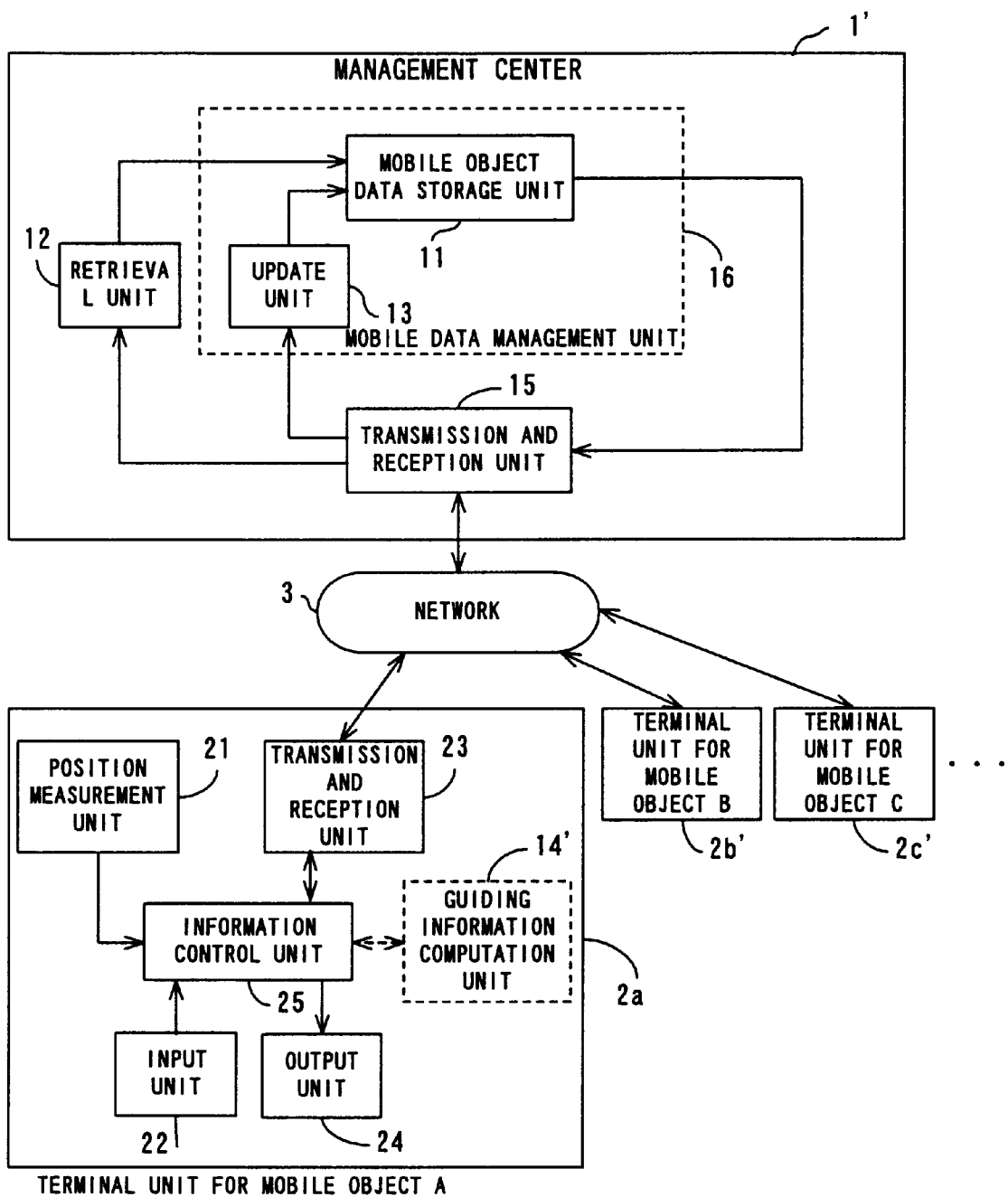
F I G. 1 2

SYSTEM FOR PROVIDING GUIDING INFORMATION FOR USE IN DETECTING AND ACCESSING A MOBILE OBJECT

BACKGROUND OF THE INVENTION

1. Field of the Invention

The present invention relates to a system for providing guiding information for use in detecting and accessing a mobile object having a desired attribute from among a group of a number of unspecified mobile objects such as human beings, creatures, objects, etc. capable of moving in a space.

2. Description of the Related Art

The conventional systems for measuring and using the location of a mobile object can be roughly dividing into two groups, that is, A) systems which use their own positional information, and B) systems which use others' positional information.

A typical example in the group A is a navigation system. A navigation system mainly aims at supporting a mobile object moving to a desired destination. In most cases, the navigation system includes: a unit for measuring the current position using, for example, a GPS (global positioning system), etc.; road map data stored in a storage medium; a unit for having a matching check between the measured current position and the road map data; a unit for planning (computing) the route to the destination; a unit for guiding a user based on the planned route to the destination; a display; a unit for outputting voice, etc.

Since the navigation system is designed as described above, the current position of each system can be displayed on the screen, a moving route to a desired destination can be computed according to road map data, and a mobile object can be guided using voice, etc. based on the computed moving route. With the above described functions, the navigation system is provided for a car, a ship, an aircraft, etc. Recently, it is also used for a portable electronic appliance.

A typical example in the group B is a position management system. The position management system aims at, for example, allowing a user of a position management center to obtain the location of a mobile object, which is separated from the user, and manage and use the obtained position of the mobile object. In most cases, the position management system includes: a unit for measuring the location of a mobile object separate from the user; a unit for transmitting measured positional information to a position management center; a unit for managing the position of the mobile object according to the transmitted positional information; a unit for using the positional information of the mobile object, etc.

Published examples relating to the technology of the above described group B are described as follows.

(a) Japanese Patent Laid-Open No.4-117823 'APPARATUS AND METHOD FOR MANAGING POSITION OF MOBILE OBJECT BASED ON MOBILE COMMUNICATIONS SYSTEM'

This relates to a mobile object position management system capable of measuring the position of a mobile object on the receiver side, and transmitting the measurement result by radio.

(b) Japanese Patent Laid-Open No.9-247730 'METHOD AND APPARATUS FOR DETECTING POSITION'

This relates to a position detection apparatus for mounting an appliance connected to a GPS receiver and a portable telephone such as a PHS (personal handyphone system), etc. onto an object whose position is to be detected, calling the portable telephone from a searcher, thereby detecting by the GPS receiver the position of the object whose position is to be detected, and transmitting the positional information to the searcher through the portable telephone.

(c) Japanese Patent Laid-Open No.8-511408 'PERSONAL LOCATOR SYSTEM'

This relates to a system and a method for detecting a person or an object carrying a portable locator unit (PLU) in a communications network. The position of the PLU is assumed to be in the area covered by a service node.

(d) Japanese Patent Laid-Open No.9-68427 'APPARATUS, SYSTEM, AND METHOD FOR CONFIRMING POSITION'

This relates to a position confirmation apparatus including a target detection unit, a communications unit, a distance specification unit, and a direction specification unit. Each of a plurality of mobile objects carries the position confirmation apparatus to display the distance and the direction from a mobile object to another mobile object (or to a target point).

The above described position management systems are used to manage the position of a business car such as a taxi, a home-delivery car, etc. in a predetermined area, manage the position of a person such as a salesman, a customer engineer (CE), etc., or detect the position of a stray old person, a child, or an object which easily gets lost.

To lead a person along a route to a desired destination using a conventional navigation system, it is necessary to determine a destination, and fix the position coordinates of the destination. Normally, the position coordinates of a destination can be obtained by searching a destination from the map information database stored in a storage device such as CD-ROM, a DVD, a hard disk, etc. A method for retrieving a desired destination from map information database can be a method for directly searching for a destination while a user is looking at a map displayed on the display screen, a method for retrieving a destination according to the information obtained by having a user input the address, the telephone number, the name, the type, etc. of the destination.

However, according to the conventional navigation system, it is difficult to lead a user along a route to a destination which is the location of a mobile object possibly moving in a space because the conventional navigation system has no unit for detecting a specified mobile object from a group of a number of mobile objects, or, if the specified mobile object can be detected, it has no unit for obtaining the position coordinates of a mobile object. Therefore, the conventional navigation system cannot detect a specified mobile object satisfying a desired condition, and provide guiding information for reaching the mobile object.

In addition, the conventional position management system aims at managing, for example, the position of a customer engineer visiting customers, detecting as soon as possible a stray old person, a child, etc. when they get lost. That is, the conventional position management system is based on that a mobile object to be managed is predetermined. To specify a predetermined mobile object, unique identification information such as an ID, etc. preliminarily set for each mobile object is used. The identification information can be the telephone number of a mobile phone connected to a portable device carried by a mobile object, an ID number assigned to the portable device, etc.

Therefore, the conventional position management system cannot detect a mobile object having an attribute requested by a user from a group of a number of unspecified mobile objects, or provide guiding information about a detected mobile object. Furthermore, since the conventional method preliminarily knows a mobile object to be managed, it is not necessary to have sufficient security to protect the privacy of the mobile object to be managed.

SUMMARY OF THE INVENTION

The present invention aims at detecting a mobile object having a desired attribute from among a group of a number of unspecified mobile objects such as human beings, objects, etc. moving outdoors, in a large space such as a building, etc.

The present invention is based on a system including a management center, and a plurality of terminal units connected to a mobile object which can be communicated with the management center through a radio communications line.

An embodiment of the present invention has the following configuration.

First, the management center includes: a mobile object data management unit managing mobile object data which is the information about the position and the attribute of the mobile object; a retrieval unit retrieving a mobile object according to the information about a mobile object detection condition transmitted from the mobile object terminal unit; and a notification unit notifying the mobile object terminal unit of a retrieval result.

Then, the mobile object terminal unit includes: a measurement unit measuring its own position; a notification unit notifying the management center of the position measured by the measurement unit; a transmission unit transmitting the management center the information about the detection condition of an attribute of the mobile object for detection of the mobile object to the management center; and a reception unit receiving the retrieval result transmitted from the management center.

An attribute of a mobile object can be, for example, the gender, the age, the area of the current position, the hobby, the occupation, etc. of a user.

With the above described configuration, the detection condition of a mobile object can be specified using the above described common attribute information, not using unique identification information, can detect a mobile object satisfying the detection condition from a group of a number of unspecified mobile objects, and can notify the user who specified the detection condition of the detection result.

According to the above described embodiment, the management center can compute the guiding information for use in accessing the detected mobile object, and transmit and outputs the computed guiding information from the management center to the mobile object terminal unit so that a moving route to the detected mobile object can be efficiently provided for the user. In addition, the guiding information can also be computed on the mobile object terminal unit side, not on the management center side.

BRIEF DESCRIPTION OF THE DRAWINGS

The present invention will be more apparent from the following detailed description, when taken in conjunction with the accompanying drawings, in which:

FIG. 1 shows an example of the configuration of the block diagram according to the present invention;

FIG. 6 shows an example of the configuration of the mobile object data storage unit;

FIG. 10 shows an example of outputting a screen notifying the detection;

FIG. 11 shows an example of outputting a mobile object list which is applied to a detection condition;

FIG. 12 shows an example of the configuration of the block diagram according to another embodiment of the present invention;

DESCRIPTION OF THE PREFERRED EMBODIMENTS

Figure 2:
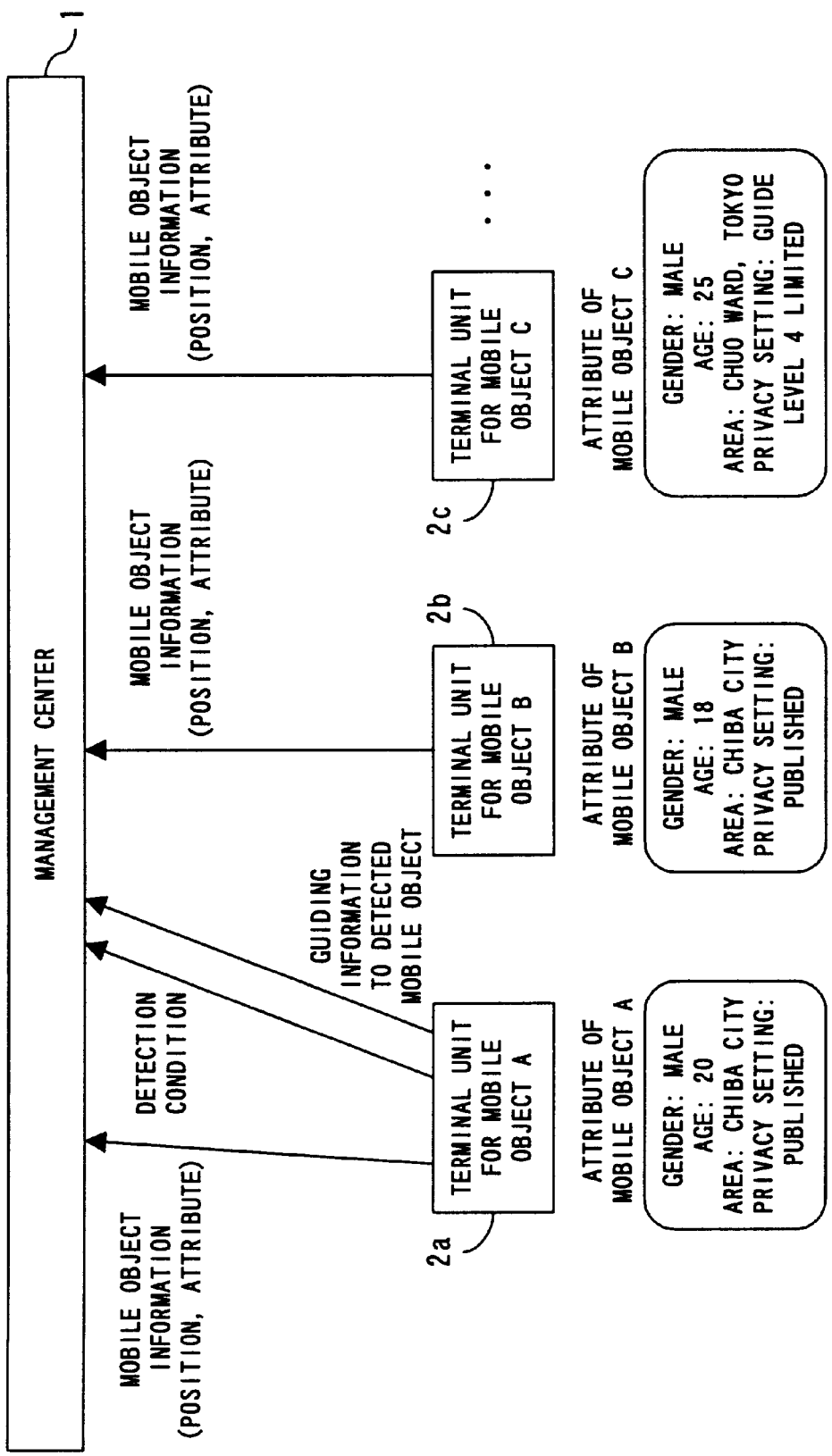
FIG. 2 shows the principle of the operations of the present invention.

The embodiments of the present invention are described below by referring to the attached drawings.

FIG. 1 shows an example of the configuration of the block diagram of the present invention. As shown in FIG. 1, the system according to the present invention comprises: a management center 1 for transmitting and receiving information through a network 3; and a plurality of mobile object terminal units 2a, 2b, . . . (hereinafter referred to as a terminal unit 2) provided in each of the plurality of mobile objects. The network 3 and the terminal unit 2 communicate information through a radio transmission line.

The management center 1 comprises: a mobile object data storage unit 11 for managing the positional information and the attribute information about a large number of mobile objects; a retrieval unit 12 for retrieving a mobile object applied to the detection condition relating to the position and the attribute of the mobile object; an update unit 13 for updating mobile object data stored in the mobile object data storage unit 11; a guiding information computation unit 14 for computing the guiding information for reaching a specified (detected) mobile object; and a transmission and reception unit 15 for receiving input information such as positional information and a detection condition from the terminal unit 2, and transmitting guiding information to the terminal unit 2.

The terminal unit 2 comprises: a position measurement unit 21 for measuring its own location; an input unit 22 for receiving a detection condition of a requested mobile object, its own attribute information, etc., a transmission and reception unit 23 for transmitting positional information, input information, etc. to the management center 1, and receiving guiding information to a detected mobile object from the management center 1; an output unit 24 for outputting the guiding information received from the management center 1; and an information control unit 25 for controlling information among the position measurement unit 21, the transmission and reception unit 23, the input unit 22, and the output unit 24.

A program for realizing each of the above described units using a computer can be stored in an appropriate storage medium such as computer-readable portable medium memory, semiconductor memory, a hard disk, etc.

In the mobile object terminal unit 2 in the above described configuration according to the present invention, the position measurement unit 21 measures the location of a mobile object, the input unit 22 inputs mobile object attribute information, a requested mobile object detection condition, etc., and the transmission and reception unit 23 transmits positional information and input information to the management center 1, and transmits a notification. Then, the output unit 24 outputs guiding information received from the management center 1 through the transmission and reception unit 23. In addition, the information communicated among the position measurement unit 21, the transmission and reception unit 23, the input unit 22, and the output unit 24 is controlled by the information control unit 25. The attribute information of a mobile object is not always input from the terminal unit 2, and can be input through another desktop computer.

On the other hand, in the management center 1, the mobile object data storage unit 11 stores the mobile object data, that is, the positional information and the attribute information of a number of mobile objects, the update unit 13 updates the contents of the mobile object data storage unit 11 to manage the data of a mobile object. The mobile object data storage unit 11 and the update unit 13 are collectively called a mobile object data management unit. The retrieval unit 12 retrieves a mobile object applied to the detection condition of a specified mobile object. The guiding information computation unit 14 computes the guiding information to a detected mobile object. The transmission and reception unit 15 transmits the computed guiding information, and transmits a notification.

FIG. 2 shows the principle of the operations of the present invention. As shown in FIG. 2, the system according to the present invention comprises the management center 1 and a plurality of terminal units 2. The terminal unit 2 can be a portable computer, or can be built in a mobile object.

The operations performed when a mobile object A detects another mobile object B or C having a specified attribute and requests guiding information are listed as follows:

1) The management center 1 manages and stores the positional information of the mobile objects A, B, C, . . . having the terminal unit 2, and the mobile object information of an attribute (gender, age, occupation, hobby, privacy setting level, etc.).

2) The mobile object A transmits to the management center 1, as a detection condition, through the terminal unit 2a for the mobile object A the attribute information (for example, a masculine gender, over 18 years old, etc.) specifying the mobile objects B and C to be detected.

3) The management center 1 retrieves the stored mobile object data based on the received detection condition.

4) When the mobile objects B and C satisfying the detection condition are detected, a detected mobile object list containing the mobile objects is displayed on the terminal unit 2a for the mobile object A at the levels of respective privacy settings.

5) At a request, the guiding information for the mobile objects B and C is computed. However, the guiding information is limited to protect the privacy of the mobile objects B and C. For example, since the privacy for the mobile object B is set as 'published', the management center 1 obtains the positional information about the mobile object B, and computes the route information from the mobile object A to the mobile object B. Since the privacy for the mobile object C is set as 'limited to guide level 4 (only location)', the management center 1 obtains the positional information of the mobile object C, and sets only the location of the mobile object C as the guiding information.

6) The management center 1 transmits to the terminal unit 2a for the mobile object A the computed guiding information to the mobile object B or C. The terminal unit 2a for the mobile object A outputs the received guiding information to a display or a speaker, etc.

Described next in detail are the terminal unit 2 and the management center 1.

[1] Terminal Unit for Mobile Object

Figure 3:
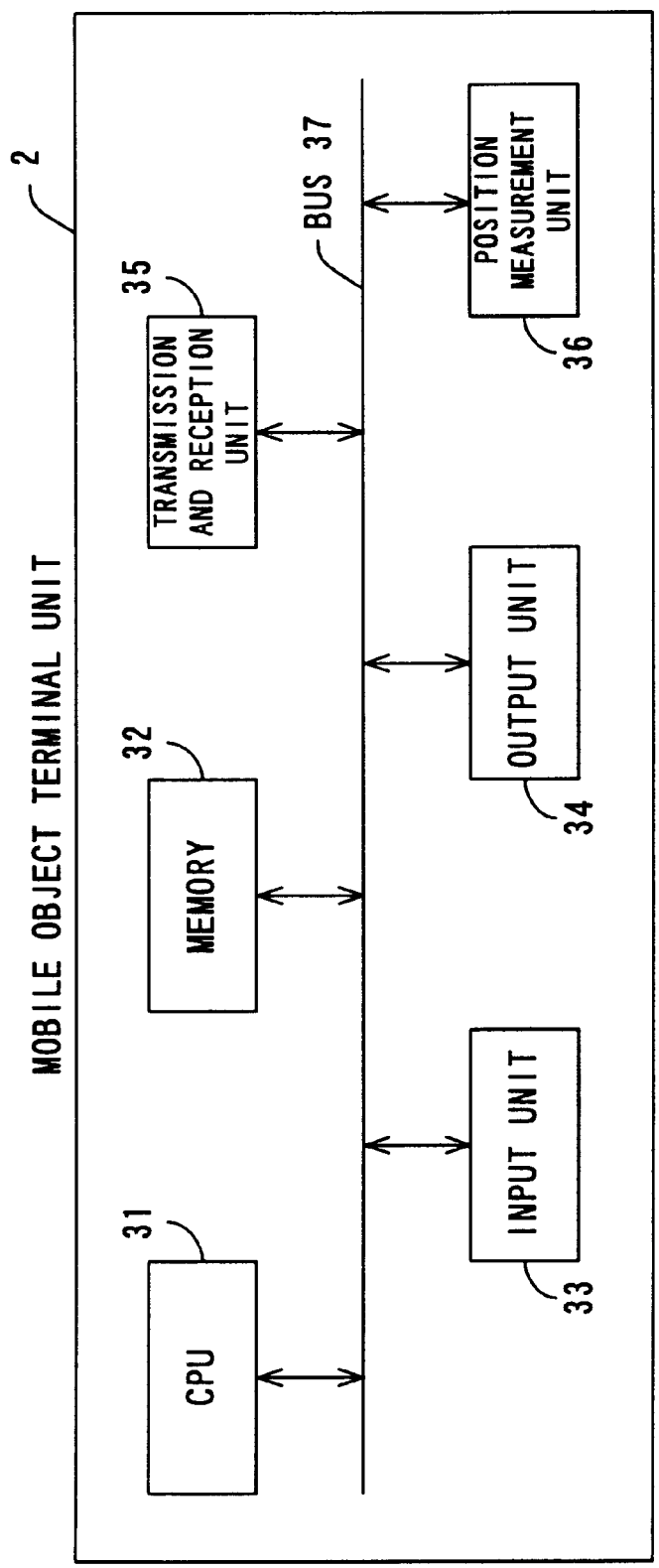
FIG. 3 shows an example of the configuration of the hardware of the mobile object terminal unit.

FIG. 3 shows an example of the configuration of the hardware of a mobile object terminal unit. The terminal unit 2 comprises CPU 31, memory 32, an input unit 33, an output unit 34, a transmission and reception unit 35, and a position measurement unit 36. These units are connected through a bus 37. The memory 32 stores programs for realizing the input unit 22 shown in FIG. 1 through the input unit 33, the output unit 24 through the output unit 34, the information transmission and reception unit 23 through the transmission and reception unit 35, the position measurement unit 21 through the position measurement unit 36, and the information control unit 25. These programs are executed by the CPU 31.

Figure 4:
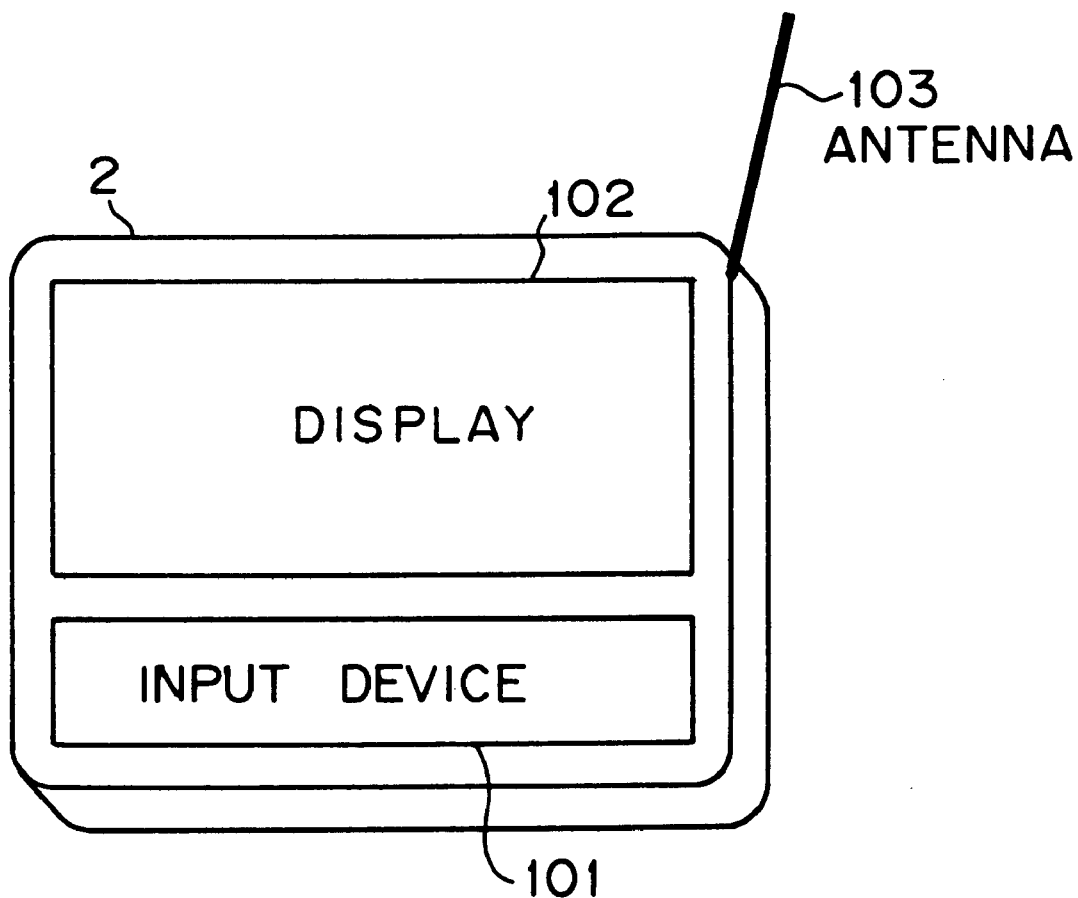
FIG. 4 shows an example of the appearance of the mobile object terminal unit.

FIG. 4 shows an example of the appearance of the mobile object terminal unit 2. The mobile object terminal unit 2 shown in FIG. 4 is an example of a portable information processing appliance. An input device 101 corresponds to the input unit 33 shown in FIG. 3, a display 102 corresponds to the output unit 34 shown in FIG. 3, and an antenna 103 corresponds to a part of the transmission and reception unit 35 shown in FIG. 3.

The position measurement unit 21 in the terminal unit 2 shown in FIG. 1 measures the location of a mobile object at the intervals of a predetermined time or at an instruction from the management center 1 or a user. The position measurement unit 21 can be realized by the position measurement unit 36, the CPU 31, the memory 32, etc. of the terminal unit 2. The hardware of the position measurement unit 36 can be, for example, a GPS position measurement device, a position measurement device using a PHS, etc. Normally, since a GPS position measurement device is better in position measurement precision than a position measurement device using a PHS, the device using the GPS is more popularly used. However, the GPS device is ineffective in a building, etc. in which it cannot receive a signal from a GPS satellite. On the other hand, the PHS device can be used in a building, etc. in many cases. Therefore, the system can be designed such that a GPS device can be switched into a PHS device when the GPS becomes unavailable. Furthermore, when the terminal unit 2 can be connected to a vehicle, and can measure the moving speed and the direction, the location can be computed in the autonomous navigation method.

The input unit 22 is used to input an operation instruction to operate the terminal unit 2, to input data to an item of the mobile object data entered in the management center 1, and to input the detection condition of a desired mobile object. The input unit 33 of the hardware used by the input unit 22 comprises a keyboard, a touch pen, a voice input device, etc.

The output unit 24 is used to output the guiding information and the mobile object data received from the management center 1, and to display the state of the terminal unit 2. The output unit 34 used by the output unit 24 comprises a liquid crystal display, a voice output device, etc.

The transmission and reception unit 23 transmits and receives information between the terminal unit 2 and the management center 1. The information transmitted from the terminal unit 2 to the management center 1 can be mobile object data input by the input unit 22, the detection condition of a mobile object to be detected, the positional information measured by the position measurement unit 21, an operation instruction, etc. On the other hand, the information transmitted from the management center 1 to the terminal unit 2 can be mobile object data, the contents of the data allowed to be viewed among the mobile object data stored in the mobile object data storage unit 11, the guiding information computed by the guiding information computation unit 14, an instruction requesting to measure a position, etc. The transmission and reception unit 35 of the hardware used by the transmission and reception unit 23 comprises an interface such as a mobile telephone, a radio, a public telephone line, etc.

The transmission and reception unit 25 controls the position measurement unit 21, the transmission and reception unit 23, the input unit 22, and the output unit 24. The program for the control is stored in the memory 32, and executed by the CPU 31. Especially, the information control unit 25 controls the timing at which the position coordinate obtained by the position measurement unit 21 is transmitted to the management center 1. The positional information is transmitted from the terminal unit 2 to the management center 1 when:

1) the position coordinate exceeds a predetermined reference value;
2) the measurement interval exceeds a predetermined time;
3) a request to transmit positional information is issued from the management center 1, etc.

[2] Management Center

Figure 5:
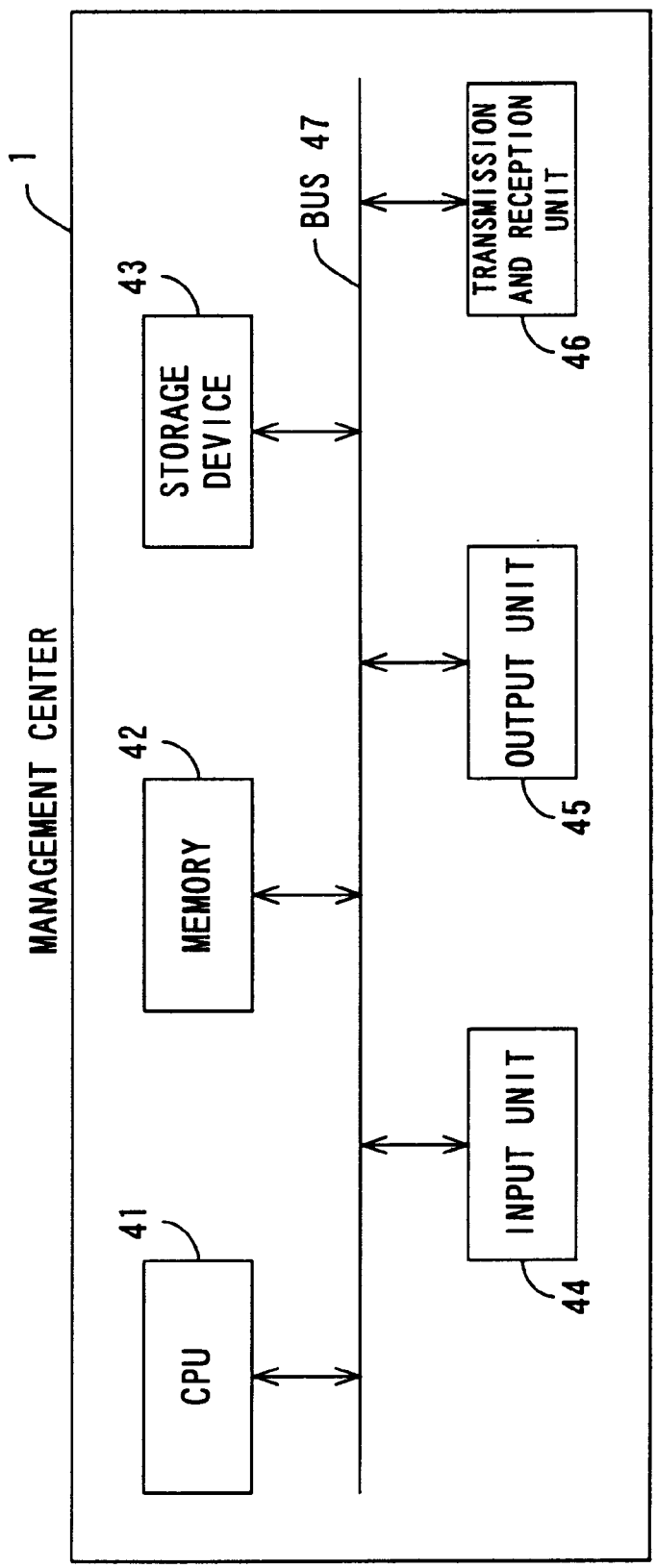
FIG. 5 shows an example of the configuration of the hardware of the management center.

FIG. 5 shows an example of the configuration of the hardware of the management center 1. The management center 1 comprises a CPU 41, memory 42, a storage device 43, an input unit 44, an output unit 45, and a transmission and reception unit 46. These units are connected through a bus 47.

The storage device 43 comprises, for example, semiconductor memory, a hard disk, an auxiliary storage device such as CD-ROM, etc. The mobile object data storage unit 11 is designed in the storage device 43. The memory 42 stores a program for realizing the retrieval unit 12, the update unit 13, the guiding information computation unit 14, the transmission and reception unit 15, etc., and the program is executed by the CPU 41. The input unit 44 is an input device such as a keyboard, a mouse, etc., and is used to operate the management center 1. The output unit 45 is a display, a speaker, etc., and outputs information to a user directly operating the management center 1.

Sequentially described below are the mobile object data storage unit 11, the retrieval unit 12, the update unit 13, the guiding information computation unit 14, and the transmission and reception unit 15 in the management center 1 shown in FIG. 1.

The mobile object data storage unit 11 stores the management setting data, the attribute data, the positional data, etc. relating to an entered mobile object. FIG. 6 shows an example of the configuration of the mobile object data storage unit when a mobile object is a person. The mobile object data shown in FIG. 6 contains the items of management setting data such as a mobile object ID (identification name), access information, a password, a privacy setting, and a classification, the items of attribute data such as a name, a gender, a birthday, an occupation, an address, the phone number of a mobile telephone, the telephone number of home telephone, an electronic mail address, and a hobby, the items of positional data such as a position coordinate, a measurement time, and past positional data, and a free entry column.

The access information refers to a number for access from the management center 1 to the terminal unit 2. When access is gained using a mobile telephone connected to the terminal unit 2, it refers to the telephone number of the mobile telephone. A privacy setting refers to level setting information about what to do when a user itself is detected in another mobile object. The privacy setting can be, for example, any of 'unpublished', 'consultation required', 'limited guide level', or 'published'. The 'unpublished' refers to completely unpublishing guiding information. The 'consultation required' refers to a request for consultation with a detection requester. The 'limited guide level' refers to a detailed level of guiding information to be provided. The 'published' refers to publishing complete guiding information. The detailed level of the guiding information is described when a guiding information computation unit is explained later.

As the attribute data of a mobile object other than the mobile object data shown in FIG. 6 can be, for example, a blood type, a height, a weight, an address to be accessed in an emergency, members of the family, a credit card number, an image, clothes, etc. In addition, when a mobile object is a creature such as a pet, such items as a name, a type of the pet, the color of hair, other characteristics of the pet can be used as attribute data. Furthermore, when a mobile object is an artificial object, for example, a name, a production date, a type, a weight, a size, a price, etc. can be used as attribute data.

The update unit 13 updates a part or all of the mobile object data stored in the mobile object data storage unit 11. Normally, all mobile object data is updated when the mobile object data is newly entered. In the normal operation, only a part of the mobile object data is updated. The items of mobile object data which can be frequently updated are a position coordinate and a measurement time. The position coordinate and the measurement time are updated when:

1) a new position coordinate is transmitted from a mobile object whose position coordinate exceeds a predetermined reference value;
2) the measurement interval exceeds a predetermined time; and
3) the positional information is transmitted from the terminal unit 2 at an instruction from the management center 1.

When a position coordinate is updated, it is moved to the item of the past position coordinate before an updating process is performed. The mobile object data other than the position coordinate or the measurement time is updated as necessary by a user of the terminal unit 2 and the management center 1. The data for use in updating the mobile object data is input using the input unit 22 of the terminal unit 2, and transmitted to the management center 1 through the transmission and reception unit 23, or input through the input unit 44 of the management center 1. However, the mobile object data is protected by a password, and can be updated only when the password (the password is 'ABCD' in FIG. 6) is confirmed.

The retrieval unit 12 retrieves mobile object data applied to a specified detection condition from the mobile object data stored in the mobile object data storage unit 11. As a detection condition of a mobile object, a keyword, etc. relating to a mobile object ID, access information, items of attribute data, items of positional data, a free entry column, etc. in the mobile object data can be specified. However, the detection condition relating to positional data is not directly specified by a position coordinate, but by a condition in an area sectioned by, for example, an administrative section (for example, Mihama Ward of Chiba City), and by a condition in a specified distance from a specified place (for example, within 2 km from Makuhari Messe convention center).

As a detection condition, for example, the following conditions can be specified.

a) a detection condition specifying a mobile object
   example: '(Mobile Object ID: A12B3)', '(Access Information: 1234567890)'
b) a detection condition specified only by the attribute of a mobile object
   example: '(hobby: baseball) and (address: Chiba City) and (free column: collection for a match)'
c) a detection condition specified by the attribute and the position of a mobile object
   example: '((hobby: baseball) or (hobby: mountain climbing)) and (position: within 1 km from Makuhari Messe)'
d) a detection condition specified only by a position
   example: '(position: within 1 km from Makuhari Messe)'

Figure 7:
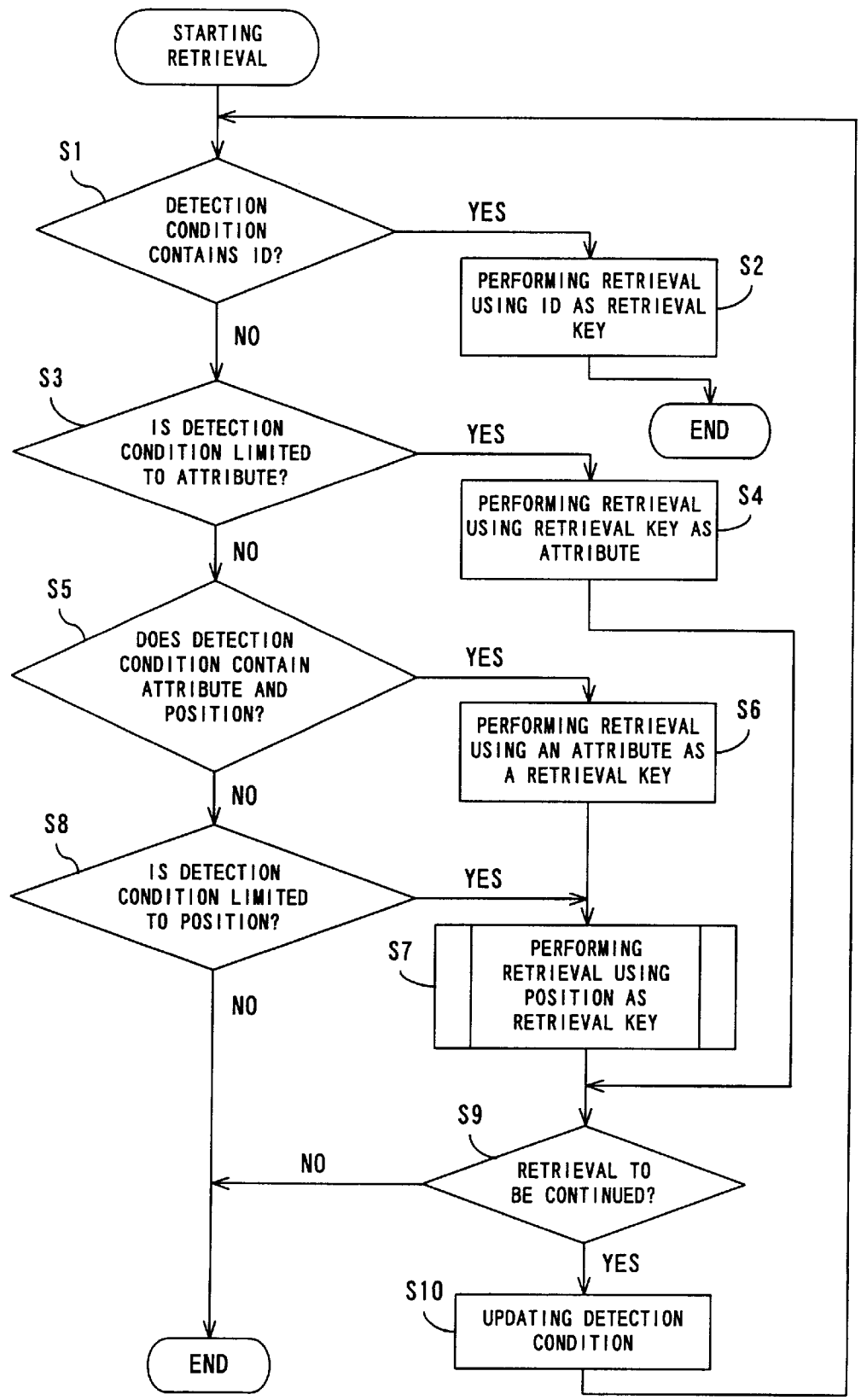
FIG. 7 is a flowchart of the process of retrieving a mobile object.

A mobile object is retrieved by the retrieval unit 12 as shown by the process flowchart in FIG. 7. In the process flowchart shown in FIG. 7, it is checked in step whether or not the detection condition contains an ID. An ID refers to a mobile object ID, access information, etc. by which the mobile object can be uniquely specified. When a check result is YES (true), then the ID is defined as a retrieval key in step S2, and the mobile object data is retrieved in the conventional retrieving method. In the example described in the detection condition a) above, a mobile object having the mobile object ID of 'A12B3', or a mobile object having the access information of 1234567890' can be uniquely detected. When a check result is NO (false), control is passed to the next step S3.

In step S3, it is checked whether or not a detection condition is specified only by the attribute of a mobile object. If a check result is YES (true), then the attribute of the detection condition is defined as a retrieval key in step S4, and the mobile object data is retrieved in the conventional retrieving method. A plurality of mobile objects can be applied to a detection condition as a result of the retrieval. For example, a plurality of mobile objects containing the mobile object data as shown in FIG. 6 can be detected by performing a retrieving process under the detection condition indicated in b) above. After performing the retrieving process, control is passed to step S9. If the check result in step S3 is NO (false), then control is passed to step S5.

Figure 8:
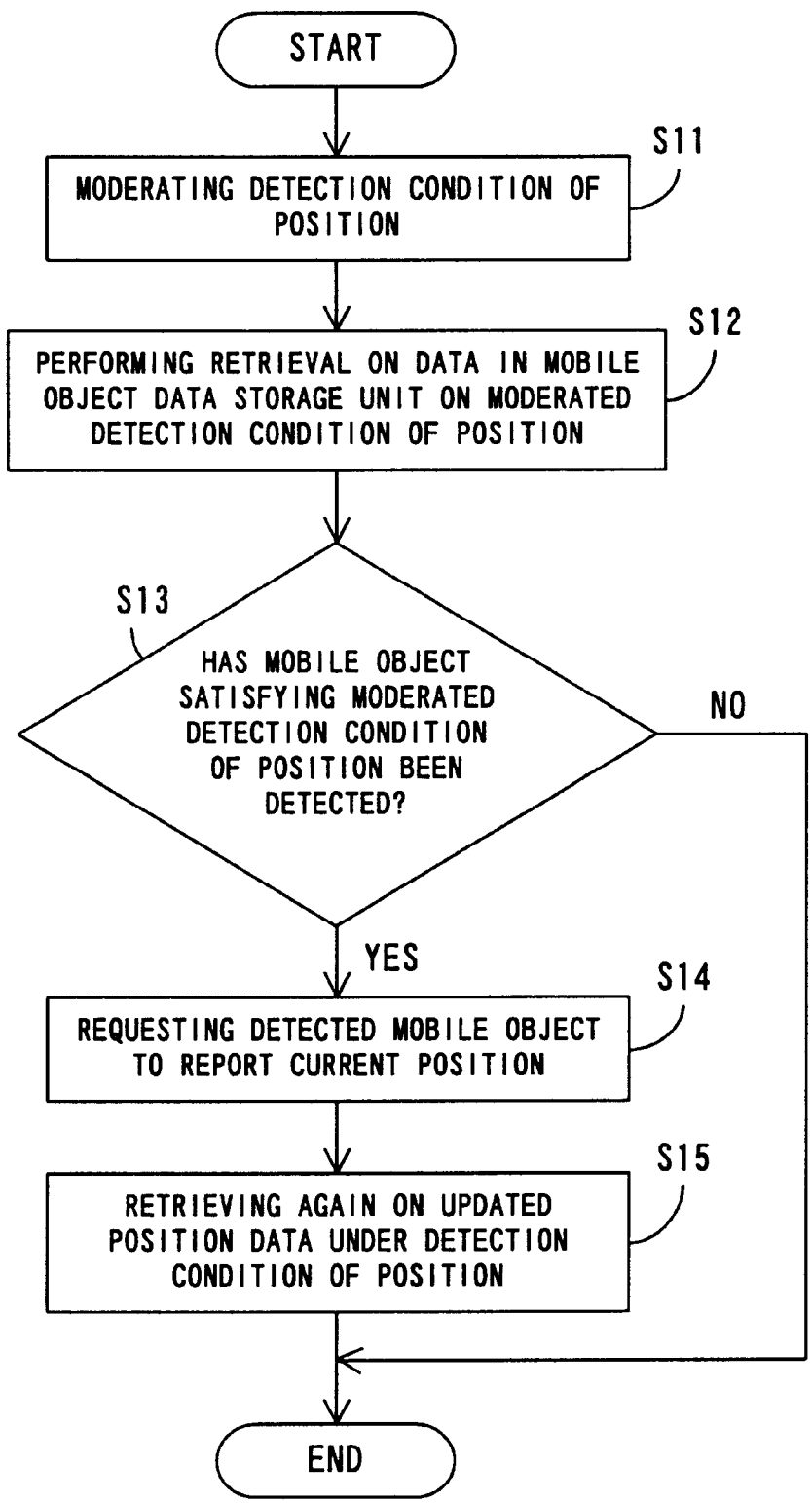
FIG. 8 is a flowchart of a retrieving process using a position as a retrieval key.

In step S5, it is checked whether or not the detection condition contains both attribute and position. If the check result is YES (true), then the retrieval is defined as an attribute in step S6 as in the above described process in step S4, and the mobile object data is retrieved in the conventional retrieving method. Then control is passed to step S7, and a retrieving process is performed on the retrieved mobile object using the position as a retrieval key. The process flowchart of the retrieving method using the position as a retrieval key is shown in FIG. 8, and the details are described later. If the check result is NO (false) in step S5, then control is passed to the next step S8.

In step S8, it is checked whether or not the position is only the detection condition. If the check result is YES (true), then control is passed to step S7, and the retrieving process is performed using the position as a retrieval key. After performing the retrieving process, control is passed to step S9. If the check result is NO (false), then the detection condition is not appropriate, thereby terminating the retrieving process.

If the retrieving process is to be continued in step in S9 as a result of performing the retrieving process in steps S4 and S7 as described above, the detection condition is updated (step S10), and then control is returned to step S1, thereby resuming the retrieving process. If the retrieving process is not to be continued, then the process terminates.

FIG. 8 is a flowchart of the retrieving process using the position as a retrieval key. The retrieving process using the position as a retrieval key is described below by referring of the process flowchart.

In step S11, the detection condition of the position is moderated. To moderate the detection condition of the position is to retrieve mobile objects in a range larger than a specified range in consideration that mobile objects are moving. For example, if the detection condition is 'Mihama Ward of Chiba City', it is moderated into 'all area of Chiba City', or the detection condition of 'within 1 km from Makuhari Messe' is moderated into 'within 5 km from Makuhari Messe'. How the detection condition of the position is to be moderated can be set in relation to the update intervals of the position coordinate data of the mobile object data storage unit 11.

In step S12, the retrieving process is performed on the data in the mobile object data storage unit 11 under the moderated detection condition of the position. For example, the mobile object data in the mobile object data storage unit 11 is retrieved under the moderated detection condition of the position of 'within 5 km from Makuhari Messe'.

In step S13, it is checked whether or not a mobile object satisfying the moderated detection condition of the position has been detected. If the check result is YES (true), then control is passed to the next step S14. If the check result is NO (false), then the process terminates as unsuccessful retrieval.

In step S14, the terminal units 2 of all mobile objects detected as a result of the retrieving process in step S13 are requested to transmit the current position coordinates according to the access information.

In step S15, the detection condition of the position is checked again for the updated positional data of the mobile objects detected as a result of the retrieving process in step S13 so that only the mobile objects really satisfying the detection condition can be selected, thereby terminating the process.

The detection condition of the position is moderated because the positional data of a mobile object stored in the mobile object data storage unit 11 does not always indicate the location of the mobile object correctly, but the mobile object can have moved to a different position. The timing of updating the position coordinate in the mobile object data storage unit 11 has been described above. In addition, to know the current position coordinate of a mobile object, it is more efficient to first roughly limit mobile objects and have only the selected mobile objects report their own position coordinates than to have the terminal unit 2 of all mobile objects report their position coordinates.

In addition to the retrieving method in which the position is a detection condition as shown in FIG. 8, there is a retrieving method according to the position coordinate data in the mobile object data storage unit 11, and a retrieving method according to the latest position coordinate after issuing a request to all mobile objects to update their own positional information.

Figure 9:
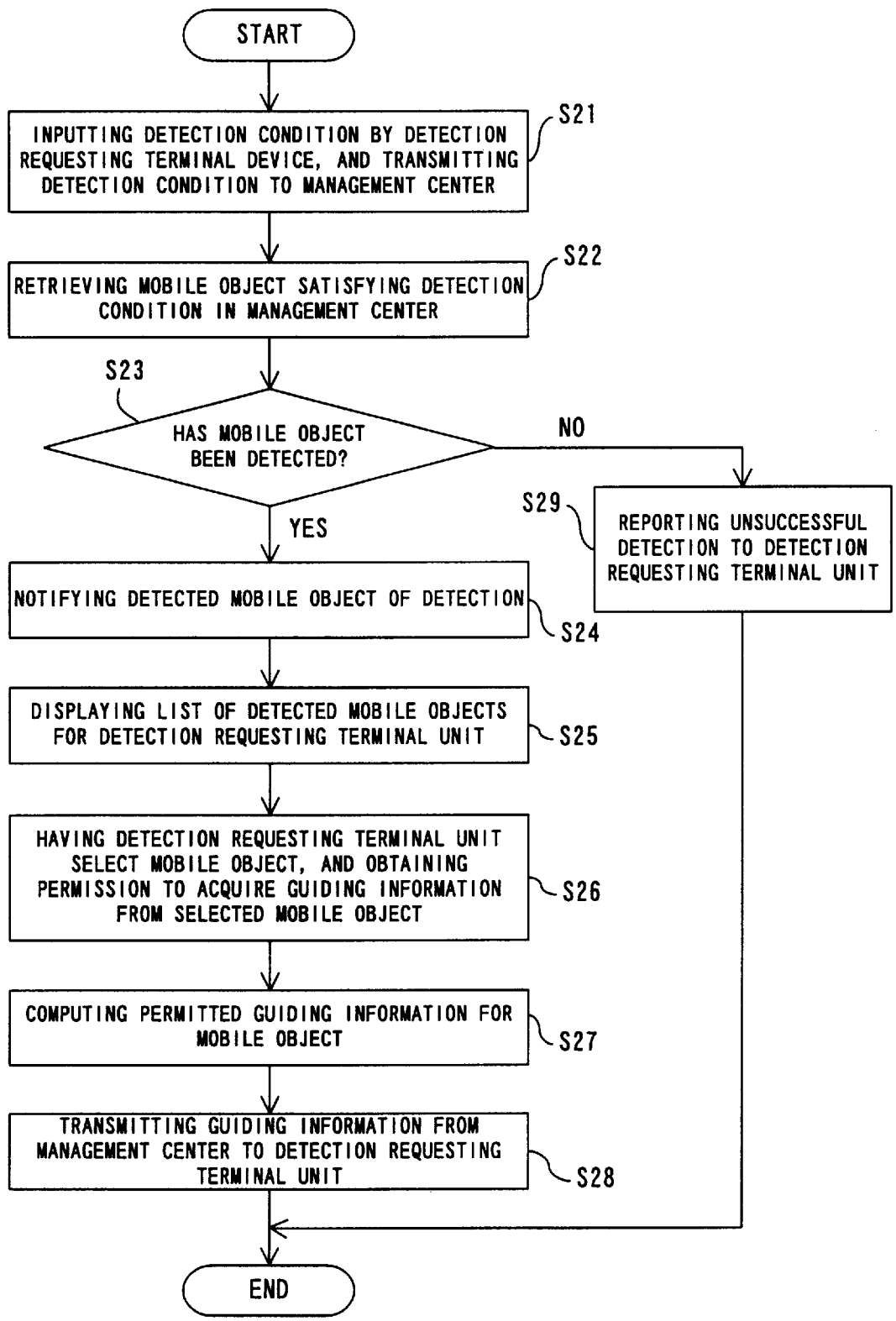
FIG. 9 is a flowchart of the processes from the input of a detection condition to the output of guiding information.

The guiding information computation unit 14 computes the guiding information about a detected mobile object. FIG. 9 is a process flowchart from the input of a detection condition to the output of guiding information. The guiding information computation unit 14 relates to a processes in steps S24 through S27 in a series of processes shown in FIG. 9. Sequentially described below are the contents of these processed.

In step S21, when the detection requesting terminal unit 2 requests to detect another mobile object having desired position and attribute, it inputs the desired position and attribute and transmits them to the management center 1. In step S22, the management center 1 retrieves a mobile object satisfying the detection condition from the mobile object data storage unit 11 according to the process flow shown in FIG. 7. When an applicable mobile object can be detected, control is passed to step S24. If it cannot be detected, then control is passed to step S29, and a notification about the unsuccessful detection is transmitted to the detection requesting terminal unit 2, thereby terminating the process.

In step S24, the terminal unit of a detected mobile object is informed that the mobile object has been detected by a detection requester. FIG. 10 shows an example of outputting the screen notifying the terminal unit of a detected mobile object that it has been detected. In this output example, the report that it has been detected, the contents of the detection condition, a simple attribute of the detection requester, a question as to whether or not the privacy setting for the detection requester is to be changed, etc. are output.

In the privacy setting, the action to be taken by a mobile object when it is detected is set. The privacy settings can be:

'unpublished': No information is published to a detection requester.

'limited guide level': Guiding information at a specified level is published.

'consultation required': A determination is made after consulting with a detection requester. In this case, a detected mobile object is notified of a method of communicating with a detection requesting mobile object (for example, a telephone number, an electronic mail address, etc.), the detected mobile object communicates with the detection requesting mobile object for consultation, and then an action to be taken is determined. However, care is taken not to disclose the information (for example, a telephone number, etc.) about the detected mobile object to the detection requesting mobile object.

'published': Guiding information at all levels are published.

In step S25, a list of mobile object satisfying the detection condition is output to the display, etc. of the detection requesting terminal unit 2. FIG. 11 shows an example of the output of a list of mobile objects satisfying the detection condition on the screen. In this output example, a listing table containing the items of number, attributes, and privacy settings is output. The numbers are serial numbers of the detected mobile objects. The attributes are a part of the attributes of the detected mobile objects other than the mobile object specified by the detection condition. The contents of the output attributes can be set by the detected mobile objects.

In step S26, the management center 1 allows the detection requester to select a mobile object from a list of mobile objects displayed on the screen of the detection requesting terminal unit 2. If necessary, permission to obtain guiding information from a selected and detected mobile object is required. If the privacy setting is 'published' or 'limited guide level', guiding information at a predetermined level can be obtained without permission. If the privacy setting is 'consultation required', the detected mobile object should be consulted with for permission. If the privacy setting is 'unpublished', guiding information cannot basically be obtained. However, when the password of each mobile object is input, permission to obtain guiding information at all levels can be gained whatever privacy setting is entered.

In step S27, the guiding information at a permitted level is computed for a selected mobile object. For example, level for the guiding information can be:

'level 1': information about the direction from the position of a detection requesting mobile object to the position of a detected mobile object 'level 2': information about the distance from the position of a detection requesting mobile object to the position of a detected mobile object 'level 3': information about the distance and the direction from the position of a detection requesting mobile object to the position of a detected mobile object 'level 4': information about the location of a detected mobile object (example: only an area name, address, etc.)

'level 5': route information from the position of a detection requesting mobile object to the position of a detected mobile object The guiding information computation unit 14 computes the above described guiding information from the position coordinate of a detection requesting mobile object and the position coordinate of a detected mobile object. The route information computed from the above described level 5 can be obtained using the road map database. Since the computation of the route information can be performed as in the conventional method of computing the route from the current place to the destination when the destination is given in a car navigation system, etc., the detailed explanation is omitted here. In addition, since the position of a detected mobile object can be changed from time to time, it is desired that the management center 1 computes again the guiding information according to new positional information periodically or when the position of a detected mobile object changes to a predetermined extent. Then, in step S28, the management center 1 transmits guiding information to the terminal unit 2, thereby terminating the process shown in the flowchart.

The time information and the place information for guiding, or the guiding information depending on situation transmitted from the management center 1 to the terminal unit 2 can be described in the description format of a markup language such as a general-purpose XML (extensible markup language) as a sequence of instructions representable in time series, thereby easily and conveniently processing and outputting the guiding information.

A practical example of an embodiment of the present invention can be:

1) A person having a requested attribute among the people in the vicinity is detected. For example, when looking for a baseball match in a stadium in Mihama Ward of Chiba City, a person having the hobby of baseball and probably appearing in the stadium can be detected by specifying as a detection condition, for example, '(hobby: baseball) and (position: Mihama Ward in Chiba City)'. The detected person is not exceedingly bothered if the privacy setting is appropriately set for persons satisfying the detection condition.

2) Propaganda is used for people in a given area. For example, when a shop makes a bargain, a person near the shop is detected and the propaganda is presented for the detected person by specifying 'within 1 km from the position coordinate of the shop' as a detection condition.

3) A mobile object which has got lost (for example, a child, a stray old person, a baggage, etc.) is detected. The terminal unit 2 is assigned to a mobile object. At this time, the manager of the above described mobile objects records an ID of a mobile object, the attribute of access information, and a password. When a mobile object gets lost, the route information about the detected mobile object can be obtained using the ID of the mobile object and the password.

4) In a hide-and-seek game, a participant of the game publishes the ID of a mobile object, or writes a special keyword (example: A2D890!3) to a free column of his or her own mobile object data. As a detection condition, the ID of a mobile object or a special keyword is specified, and the guiding information level is set only as a direction or a distance. The mobile object having the role of a seeker tries to find other mobile objects according to the limited guiding information.

Described below is another embodiment of the present invention. FIG. 12 is a block diagram of another embodiment of the present invention. When FIG. 12 is compared with FIG. 1, the guiding information computation unit 14 provided in the management center 1 in FIG. 12 is provided as a guiding information computation unit 14' on the terminal unit 2' side in FIG. 12. Thus, the guiding information about a mobile object detected based on the detection condition can be computed on the terminal unit 2 side.

The management center 1' and the terminal unit 2' shown in FIG. 12 can be respectively realized in the hardware configurations shown in FIGS. 3 and 5. Furthermore, the contents of the mobile object data stored in the mobile object data storage unit 11 forming part of a mobile data management unit 16 of the management center 1' are similar to those shown in FIG. 6. In addition, the process of retrieving a mobile object shown in the flowchart in FIGS. 7 and 8 is similarly performed by the retrieval unit 12 of the management center 1'.

Figure 13:
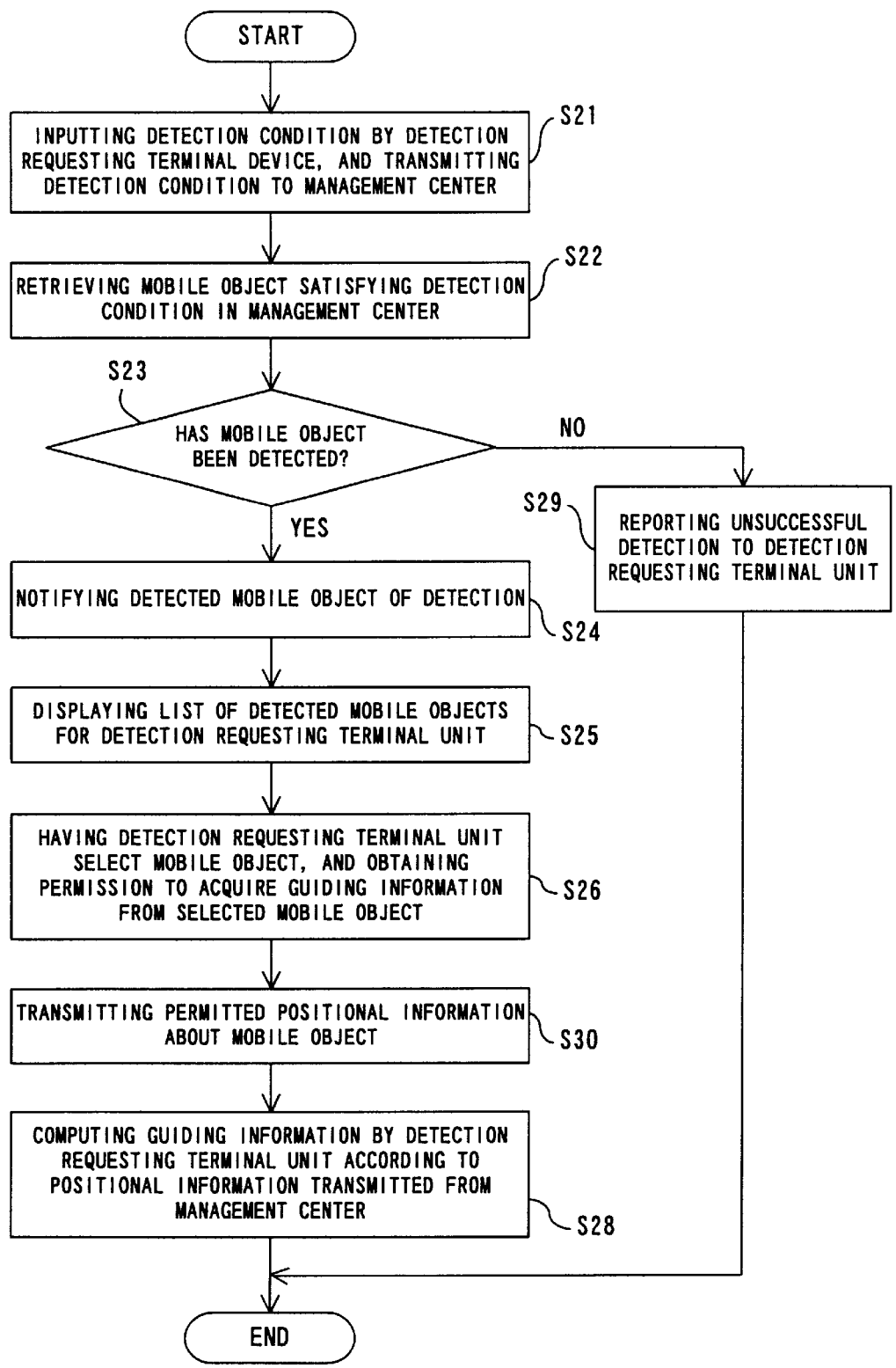
FIG. 13 is a flowchart of the processes from the input of the detection condition to the output of the guiding information according to the embodiment of the present invention shown in FIG. 12.

FIG. 13 is a flowchart of the process from the input of a detection condition to the output of guiding information in the other embodiment of the present invention as shown in FIG. 12. When FIG. 13 is compared with the flowchart shown in FIG. 9, steps S27 and S28 are deleted, and replaced with steps S31 and S32. All other steps are the same. The processes shown in FIG. 13 are described only about the portions changed from the processes shown in FIG. 9.

In step S30, the current positional information about the mobile object whose guiding information can be obtained with permission is transmitted from the management center 1' to the terminal unit 2'.

In step S31, the guiding information for access to the mobile object is computed by the guiding information computation unit 14' of the detection requesting terminal unit 2 according to the positional information transmitted from the management center 1', and the result is output from the output unit 24, thereby terminating the process shown in the flowchart.

In the process in step S31, as in the above described embodiment, the guiding information can be computed depending on the guide level set for the detected mobile object. In this case, the guide level set for the detected mobile object is transmitted with the positional information from the management center 1' to the detection requesting terminal unit 2' in step S31.

If it is necessary only to retrieve a mobile object having a detection condition as an attribute, and if guiding information is not required, then the guiding information computation unit 14' can be deleted from the terminal unit 2' shown in FIG. 12.

In addition, to have a common computer perform the functions corresponding to the terminal unit for a mobile object and a management center forming part of the system according to the present invention, it is necessary for a computer to read a program describing such that the functions are to be performed by the computer from a storage medium storing the program, to load the program onto the main memory, and to execute the loaded program by the central processing unit of the computer.

Figure 14:
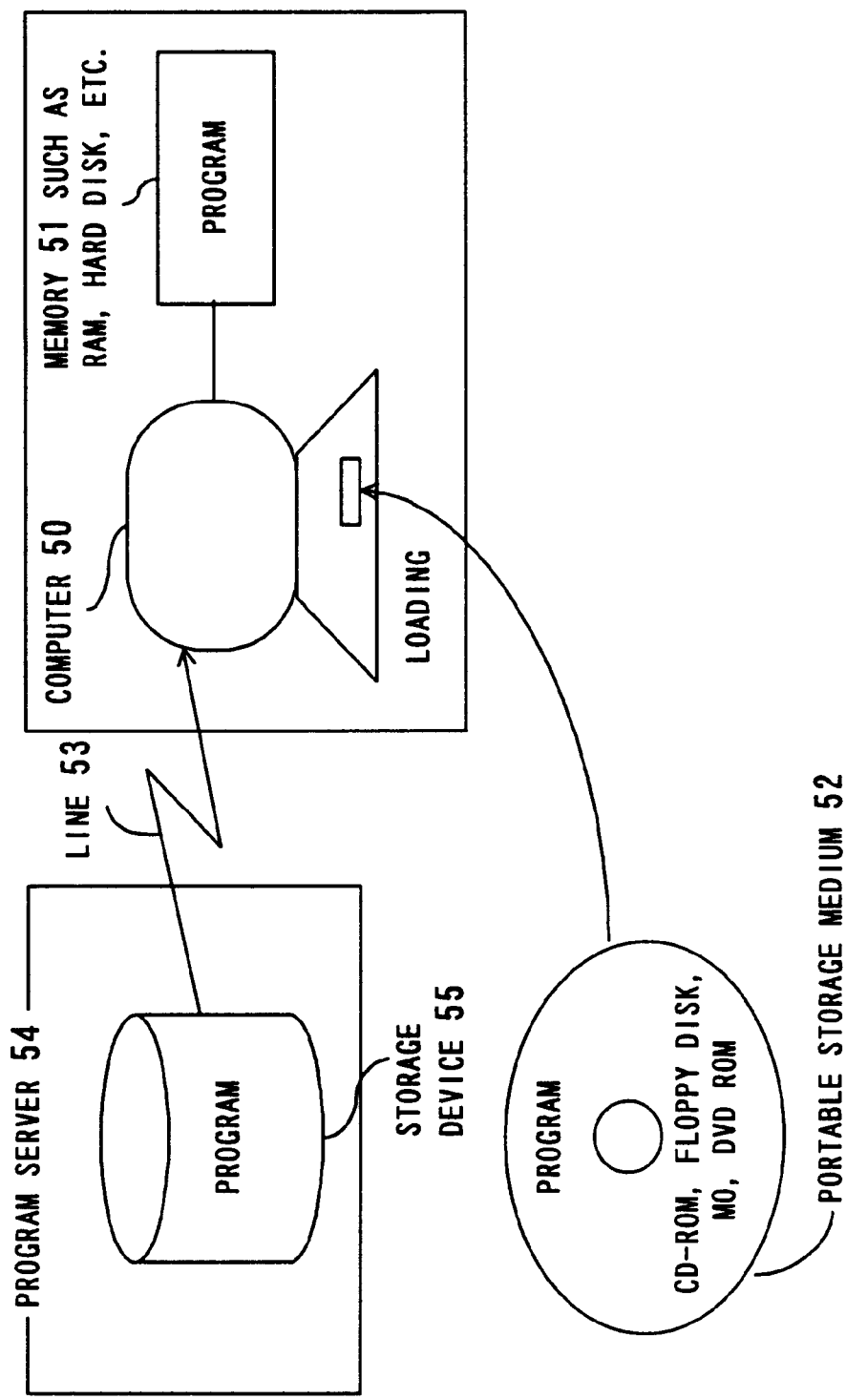
FIG. 14 shows an example of a computer-readable storage medium for reading a stored program.

FIG. 14 shows an example of a computer-readable storage medium stored in a program. Such a storage medium can be, for example, semiconductor memory built in or external to the body of a computer 50, memory 51 such as a hard disk device, etc., a portable storage medium 52 such as CD-ROM, a floppy disk, an MO (magneto-optical disk), DVD-ROM, etc., or a storage device 55 of a program server 54, which is connected to the computer 50 through a line 53, and using which the computer 50 can download a program, etc.

As described above, according to the present invention, a mobile object satisfying a detection condition optionally specified by a user can be detected according to common attribute information as well as unique identification information from a group of a number of unspecified mobile objects, thereby providing guiding information for access to the detected mobile object.

What is claimed is:

1. A system having a management center and a plurality of mobile object terminal units provided in respective mobile objects and communicating with the management center through a radio communications line, said management center comprises:
a mobile object data storage unit storing mobile object data which is information about a position and an attribute of the mobile object;
an update unit updating the mobile object data in the mobile object data storage unit;
a retrieval unit retrieving a mobile object specified by said mobile object terminal unit according to information about a detection condition of the mobile object;
a guiding information computation unit computing guiding information used for access to a mobile object detected as a result of a retrieving process performed by said retrieval unit; and
a management center side transmission and reception unit transmitting and receiving information to and from said mobile object terminal unit, wherein said mobile object terminal unit comprises:
a measurement unit measuring a position of said mobile object terminal unit;
a notification unit notifying said management center of the position measured by said measurement unit;
an input unit obtaining an input of a detection condition for detection of a mobile object;
a terminal unit side transmission and reception unit transmitting information about a detection condition obtained by said input unit to said management center, and receiving the guiding information transmitted from the management center; and an output unit outputting the guiding information received from said terminal unit side transmission and reception unit.

2. The system according to claim 1, wherein:
said mobile object data contains, for each mobile object, information about an attribute of the mobile object, information about a position of the mobile object, and management information for management of each mobile object;
said detection condition contains at least one piece of the information about the position of the mobile object, the information about the attribute of the mobile object, and the information obtained by combining the information about the position of the mobile object with the information about the attribute of the mobile object.

3. The system according to claim 1, wherein
said retrieval unit performs a retrieving process by moderating a detection condition of a position of a mobile object indicated by information about the position of the mobile object when the detection condition contains the information.

4. The system according to claim 1, wherein:
said mobile object data contains privacy setting information indicating a limit in providing the guiding information;
said management center further comprises:
a determination unit determining according to the privacy setting information whether or not the guiding information is to be provided for said mobile object terminal unit.

5. The system according to claim 4, wherein
said determination unit furthermore determines to what extent said guiding information to be provided for said mobile object terminal unit is detailed.

6. The system according to claim 5, wherein
said privacy setting information contains information about a guide level indicating a detail level of the guiding information to be provided for said mobile object terminal unit.

7. The system according to claim 6, wherein
said detail level of the guiding information indicated by the guide level relates to any of a distance from the mobile object, a direction of the mobile object, a distance and a direction of the mobile object, a name of a location of the mobile object, and a route to the location of the mobile object.

8. A method which provides guiding information used for access to a mobile object to be detected, and is used in a system having a management center and a plurality of mobile object terminal units provided in respective mobile objects and communicating with the management center through a radio communications line, said method performing processes of:
transmitting information about a detection condition for detection of a mobile object from the mobile object terminal unit to the management center;
retrieving a mobile object satisfying the detection condition;
transmitting and outputting a list of mobile objects detected as a result of the retrieving process from the management center to the mobile object terminal unit;
requesting permission to compute guiding information about a mobile object selected from the list;
computing the guiding information about the selected mobile object when the permission can be acquired; and
transmitting and outputting the computed guiding information from the management center to the mobile object terminal unit.

9. A management center in a system having a management center and a plurality of mobile object terminal units provided in respective mobile objects and communicating with the management center through a radio communications line, comprising:
a mobile object data storage unit storing mobile object data which is information about a position and an attribute of the mobile object;
an update unit updating the mobile object data in the mobile object data storage unit;
a retrieval unit retrieving a mobile object specified by said mobile object terminal unit according to information about a detection condition relating to a position, an attribute, or both position and attribute of the mobile object;
a guiding information computation unit computing guiding information used for access to a mobile object detected as a result of a retrieving process performed by said retrieval unit; and
a management center side transmission and reception unit transmitting and receiving information to and from said mobile object terminal unit.

10. A mobile object terminal unit in a system having a management center and a plurality of mobile object terminal units provided in respective mobile objects and communicating with the management center through a radio communications line, comprising:
a measurement unit measuring a position of said mobile object terminal unit;
a notification unit notifying said management center of the position measured by said measurement unit;
an input unit obtaining an input of a detection condition for detection of a mobile object;
a terminal unit side transmission and reception unit transmitting information about a detection condition obtained by said input unit to said management center, and receiving the guiding information transmitted from the management center, and used for access to the mobile object detected based on the detection condition; and
an output unit outputting the guiding information received from said terminal unit side transmission and reception unit.

11. A computer readable storage medium storing a program for directing a computer as a management center in a system having a management center and a plurality of mobile object terminal units provided in respective mobile objects and communicating with the management center through a radio communications line, said program directing a computer to perform the processes of:
managing mobile object data which is information about a position and an attribute of the mobile object;
receiving information about a detection condition of a position, an attribute, or both position and attribute of a mobile object transmitted from said mobile object terminal unit;
retrieving the mobile object according to the received information about the detection condition;
computing guiding information for use in accessing to a mobile object detected as a result of the retrieving process; and
transmitting the guiding information to the mobile object terminal unit.

12. A computer readable storage medium storing a program for directing a computer as a mobile object terminal unit in a system having a management center and a plurality of mobile object terminal units provided in respective mobile objects and communicating with the management center through a radio communications line, said program directing a computer to perform the processes of:

measuring a position of each position, notifying the management center of the measured position;

obtaining an input of a detection condition for detection of a mobile object;

transmitting information about the input detection condition to the management center;

receiving guiding information transmitted from the management center and used for access to a mobile object detected under the input detection condition; and outputting the guiding information received from the terminal unit side transmission and reception unit.

13. A system having a management center and a plurality of mobile object terminal units provided in respective mobile objects and communicating with the management center through a radio communications line, said management center comprises:

a mobile object data management unit managing mobile object data which is information about a position and an attribute of the mobile object;

a retrieval unit retrieving a mobile object according to information about a detection condition of the mobile object transmitted from the mobile object terminal unit; and a notification unit notifying the mobile object terminal unit of the retrieval result from the retrieval unit, wherein:

said mobile object terminal unit comprises:

a measurement unit measuring a position of said mobile object terminal unit;

a notification unit notifying said management center of the position measured by said measurement unit;

a transmission unit transmitting, to the management center, information about a detection condition of an attribute of a mobile object; and a reception unit receiving the retrieval result notified from the management center.

14. The system according to claim 13, wherein said mobile object terminal unit further comprises:

a guiding information computation unit computing guiding information for use in accessing a mobile object detected based on the detection condition as a retrieval result and received from the reception unit.

15. A method for use in detecting a mobile object and in a system having a management center and a plurality of mobile object terminal units provided in respective mobile objects and communicating with the management center through a radio communications line, said method performing processes of:

transmitting information about a detection condition of an attribute of a mobile object for detection of the mobile object from the mobile object terminal unit to the management center;

retrieving a mobile object satisfying the detection condition; and transmitting and outputting a list of mobile objects detected as a result of the retrieving process from the management center to the mobile object terminal unit.

16. A management center in a system having a management center and a plurality of mobile object terminal units provided in respective mobile objects and communicating with the management center through a radio communications line, comprising:

a mobile object data management unit managing mobile object data which is information about a position and an attribute of the mobile object;

a retrieval unit retrieving a mobile object according to information about a detection condition of the mobile object transmitted from the mobile object terminal unit; and a notification unit notifying the mobile object terminal unit of the retrieval result from the retrieval unit.

17. A mobile object terminal unit in a system having a management center and a plurality of mobile object terminal units provided in respective mobile objects and communicating with the management center through a radio communications line, comprising:

a measurement unit measuring a position of said mobile object terminal unit;

a notification unit notifying said management center of the position measured by said measurement unit;

a transmission unit transmitting, to the management center, information about a detection condition of an attribute of a mobile object; and a reception unit receiving the retrieval result notified from the management center about a mobile object retrieved based on the detection condition.

18. A computer readable storage medium storing a program for directing a computer as a management center in a system having a management center and a plurality of mobile object terminal units provided in respective mobile objects and communicating with the management center through a radio communications line, said program directing a computer to perform the processes of:

managing mobile object data which is information about a position and an attribute of the mobile object;

retrieving a mobile object according to information, transmitted from the mobile object terminal unit, about a detection condition of an attribute of the mobile object to be detected; and notifying a retrieval result to the mobile object terminal unit.

19. A computer readable storage medium storing a program for directing a computer as a mobile object terminal unit in a system having a management center and a plurality of mobile object terminal units provided in respective mobile objects and communicating with the management center through a radio communications line, said program directing a computer to perform the processes of:

measuring a position of each position, notifying the management center of the measured position;

transmitting information about a detection condition of an attribute of a mobile object to be detected to the management center; and receiving a result, from the management center, of retrieving a mobile object detected under the detection condition.

* * * * *